June 6, 1950     O. H. DICKE ET AL     2,510,562
SUSTAINED POWER ELECTRIC CLOCK

Filed April 15, 1944     2 Sheets-Sheet 1

Inventors
O.H.Dicke and R.H.Dicke
By Oscar H. Dicke
Their Attorney

June 6, 1950  O. H. DICKE ET AL  2,510,562
SUSTAINED POWER ELECTRIC CLOCK
Filed April 15, 1944  2 Sheets-Sheet 2

Inventors
O. H. Dicke and R. H. Dicke
By
Oscar H. Dicke
Their Attorney

Patented June 6, 1950

2,510,562

UNITED STATES PATENT OFFICE 2,510,562

SUSTAINED POWER ELECTRIC CLOCK

Oscar H. Dicke, Rochester, N. Y., and Robert H. Dicke, Cambridge, Mass., assignors to International Business Machines Corporation, New York, N. Y., a corporation of New York Application April 15, 1944, Serial No. 531,182

26 Claims. (Cl. 58—26)

This invention relates to a sustained power synchronous electric clock and more particularly to a clock which is controlled by a synchronous motor during the presence of alternating current power and which operates as a rotary governor controlled clock during an alternating current cessation.

This application is a continuation-in-part of prior application, Ser. No. 398,129, filed June 14, 1941, now Patent No. 2,377,617, dated June 5, 1945, which is a continuation of application, Ser. No. 250,964, filed January 14, 1939, which became abandoned on June 21, 1941.

An object of the present invention resides in the provision of master clocks which will operate in sub-synchronism with the frequency of alternating current of regulated frequency so long as current is available and which will keep substantially correct time during a current cessation.

In accordance with another object of the present invention it is proposed to use a tuned reed fan blade which upon reaching a critical speed of rotation and frequency of vibration corresponding to the resonant frequency of the tuned reed, the fanning action becomes the greatest and this occurs so suddenly that the speed of the spring driven shaft is held very critically at such speed so that this spring driven tuned reed fan constitutes a very reliable and accurate rotary escapement or time measuring device. It is, of course, understood that a force, such as gravitational or magnetic, must act on said reed in a direction transverse to the axis of rotation of said reed to cause it to vibrate. It is further proposed that this rotary escapement be dominated during the presence of alternating current, by a rotary synchronous motor preferably connected to the same shaft that drives the tuned reed fan. In other words, the form of master clock proposed also operates to indicate the passing of time accurately so long as alternating current is available and substantially accurately mainfests the passing of time during a current cessation. Another object of the present invention resides in the provision of oscillatory means, harmonic in nature, which is constructed in accordance with one embodiment of the invention to resonate at the synchronous speed of the synchronous motor and in accordance with another embodiment of the invention is constructed to cause a hunting governing action, such that its critical governing speed falls above the synchronous speed but its average governing speed is the same as that of the synchronous motor speed.

Other objects, purposes and characteristic features of the present invention will be in part more particularly pointed out hereinafter and is in part obvious from the accompanying drawing in which.

Figure 1:
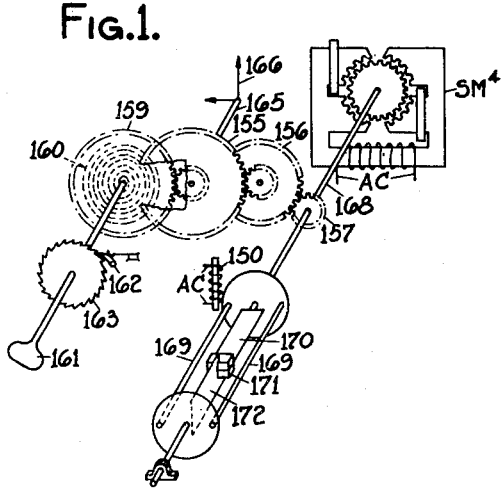
Fig. 1 illustrates one form of the present invention in which clock hands are controlled by a synchronous electric motor from a source of alternating current and which are controlled by a rotary governor during an alternating current cessation.

*Fig. 1 structure.*—The device shown in Fig. 1 is a master clock to be used in combination with the systems shown in Figs. 1 and 5 of the parent application and having the general characteristics of keeping time in accordance with the regulated A. C. current while power is on and operating as a mechanical clock while power is off. It is also useful as a sustained power mantel clock especially if automatic main spring winding means which may be added, if desired, is employed.

Referring now to Fig. 1, the non-self-starting synchronous motor SM[4] is of the construction shown and described in Fig. 1 of the application of O. H. Dicke, Ser. No. 441,109, filed April 2, 1930, now Patent No. 2,331,267. The clock under consideration is during cessation of alternating current driven through gear train 155—157 by a spring barrel and gear 159 which is actuated by main spring 160. The main spring 160 is preferably wound by a motor but is shown as wound by hand by the winding key 161, pawl 162 and pawl wheel 163 acting to keep the key 161 from turning backward. The gear 155 drives shaft 165 which in turn drives clock hands 166. On the motor shaft 168 is supported a yoke 169 in which is supported an oscillator member 170—172. The oscillator member comprises a spring reed 170 rigidly connected to shaft 168, a heavy weight 171 and a fan blade 172 disposed at right angle to the reed 170.

*Fig. 1 operation.*—The operation of the master clock shown in Fig. 1 can be conveniently divided into two parts, namely, normal operation and operation during power failure.

In normal operation the main spring 160 through gears 159, 155, 156 and 157 drives the synchronous motor SM⁴ which motor at times acts as a synchronous generator, or brake. At other times, namely, when the frequency of the alternating current is temporarily high, it acts as a synchronous motor. It thus keeps in synchronism with the alternating current supplied thereto and keeps time in accordance with the frequency supplied thereto.

Figure 1A:
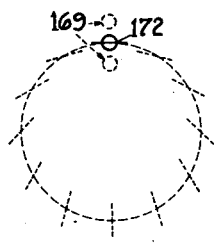
Fig. 1A illustrates diagrammatically the path that the end of the fan blades shown in Fig. 1 will take when the reed vibrates at a high amplitude.

In case of power failure the synchronous motor SM⁴ no longer acts as a motor nor as a brake, but the oscillator 170—172 now acts as a mechanical governor, in a manner to be described, to limit the speed of operation of the clock. The reed 170 supported on shaft 168 and the heavy mass 171 together comprise a harmonic system or a mechanical oscillator and the mass 171 is of such weight or is so adjusted as to make the frequency of this oscillator equal to the average speed of the synchronous motor SM⁴ when energized. The vibrator or oscillator 170—172 is so designed as to have very little air resistance in the direction of vibration. This causes its tuning to be very sharp. The fan blade 172 is in a plane in the direction of vibration so that this does not contribute to the air resistance. In operation the rotor of the synchronous motor SM⁴ together with the yoke 169 acts as a fly wheel to keep the shaft 168 in uniform rotation. Then as it rotates the oscillator weight 171 is acted upon by gravity and because of the uniform rotation this force is sinusoidal. This sinusoidal force sets up forced vibrations in the vibrator 170—172 and the vibration of the fan blade 172 causes it especially when extended to act as a brake to limit the speed, the extent of braking of course depending on the distance the fan blade 172 projects from the yoke 169. The actual path followed by the fan blade through one-half cycle, the other half cycle being the same, is shown in Fig. 1A. It is seen that the vibrator sweeps out a circle and that the fan blade is so oriented to effectively dissipate energy supplied by the main spring 160 when the shaft 168 approaches its critical correct time manifesting speed. In other words, as the speed of the shaft 168 increases and as it approaches the natural frequency of the tuned reed 170—172 the amplitude of vibration of the reed builds up very abruptly and as it does the fanning ability of the fan 172 increases rapidly as a result of which the braking action of the fan increases rapidly thereby very effectively holding the speed of shaft 168 at its correct time manifesting value substantially irrespective of tension of main spring 160 so long as the current cessation continues. Upon termination of the current cessation the synchronous motor SM⁴ locks in with the alternating current and thereafter dominates the governor 169—172 and causes the secondary clock to operate in sub-synchronism with the alternating current. It should be understood that any suitable form of self-starting synchronous motor may be used instead of the synchronous motor SM⁴ shown.

Figure 2A:
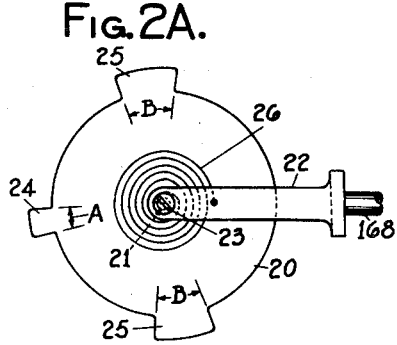
Figs. 2A and 2B illustrate a side view and end view respectively of a first modified rotary governing portion that may be substituted for the reed and fan 170—172 of Fig. 1.
Figure 2B:
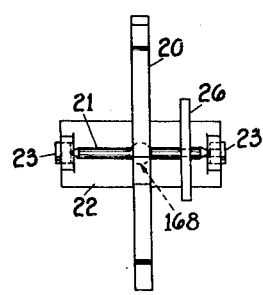

*Fig. 2 structure.*—Figs. 2A and 2B illustrate respectively a side view and end view of a balance wheel rotary governor which constitutes a modification of the reed governor 170—172 of Fig. 1 and may be substituted for the reed governor in the time structure illustrated in Fig. 1.

Referring to Figs. 2A and 2B, the device constitutes in part a balance wheel 20 rigidly mounted on shaft 21 which shaft is supported in yoke 22 by bearing 23. The yoke 22 is supported by shaft 168 in such a way that the symmetry axis of yoke 22 is coaxial with shaft 168. Shaft 168 may be identified with or considered to be shaft 168 of Fig. 1. The balance wheel 20 carries a lug 24 hereinafter called "gravity driving lug," and two lugs 25, hereinafter called "centrifugal restoring lugs." The lugs 24 and 25 are symmetrically placed on the periphery of wheel 20 with the lugs 25 diametrically opposite and with the lug 24 substantially half way between lugs 25. The angles made by the widths of lugs 24 and 25 at the center of wheel 20 are denoted by A and B respectively.

The shaft 21 supports a hair spring 26 which is at one end rigidly fixed thereto and at the other end anchored to the yoke 22. The hair spring 26, in the absence of gravity biases the wheel 20 to such a position as to place lug 24 axially with respect to the axis of shaft 168.

*Fig. 2 operation.*—The mode of operation of the rotary governor shown in Figs. 2A and 2B may be either one of two different types. The first type of operation will be called "continuously acting" and the second type "intermittent" or "hunting" operation. Whether a given governor will operate as a continuous or intermittent type will depend on its design. It is convenient to first consider the continuous acting type of operation of the Figs. 2A–2B structure.

Referring to Figs. 2A and 2B the shaft 168 is driven by the gear train and main spring of Fig. 1 or some other driving system. In the rotation of the yoke 22 and wheel 20 about the axis of shaft 168, gravity acting on the gravity driving lug 24 exerts a torque on the wheel 20 about the axis of shaft 21. This torque acts first in one direction then in the opposite direction with a frequency of the rotation of shaft 168.

The wheel 20 together with spring 26 constitutes a tuned mechanical resonator or balance wheel structure. The periodic torque from the gravity driving lug 24 acting on this tuned system produces an oscillation in the resonator 20, 21, and 26. In general the amplitude of oscillation is small if the frequency of the shaft 168 is much below the resonant frequency of the resonator 20, 21, and 26. The driving force acting on the shaft 168 causes it to speed up until the resonance frequency of the resonating system 20, 21 and 26 is approached. A large oscillation then builds up until the power dissipated by the oscillating system is equal to the power introduced by shaft 168.

The restoring force of spring 26 is not the only restoring force which acts on wheel 20. The centrifugal force acting on the centrifugal restoring lugs 25 due to the rotation about the axis of shaft 168 also acts in such a direction as to return the wheel 20 to its normal position. However, the centrifugal force acting on the gravity driving lug 24 acts in the opposite direction or acts as a negative restoring force. By adjusting the sizes of these lugs, that is the angles A and B, it is possible to make the centrifugal restoring force either positive or negative. In particular it is possible to make the positive and negative centrifugal restoring forces cancel each other. The condition for this is that the angle A (Fig. 2A) should be twice the angle B. This possible, but undesired, construction has however not been illustrated in the drawings.

Figure 3:
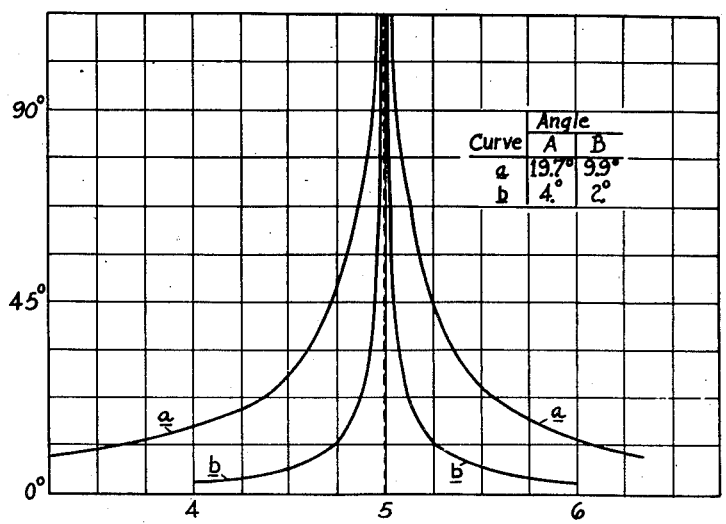
Figs. 3 and 4 illustrate performance curves of several designs of the oscillator shown in Figs. 2A-2B.

In Fig. 3 are plotted resonance curves for two particular examples of rotary governors employing zero centrifugal restoring force. The ordinate plotting is the amplitude of oscillation expressed in degrees, and the abscissa plotting is the frequency of rotation of the shaft 168. These curves were calculated for a wheel 20 which is 0.85 cm. in diameter with a radius to the end of the lugs 24 and 25 of 1.15 cms. The spring constant was assumed to be such as to make the resonant frequency 5 cycles per sec. It was assumed that the damping forces were negligible. It is to be noted that the smaller the driving lug 24 the sharper is the resonance.

The disadvantage of a broad resonance with its poor frequency regulating characteristic can be overcome by the introduction of the centrifugal restoring forces of the restoring lugs 25.

Figure 4:
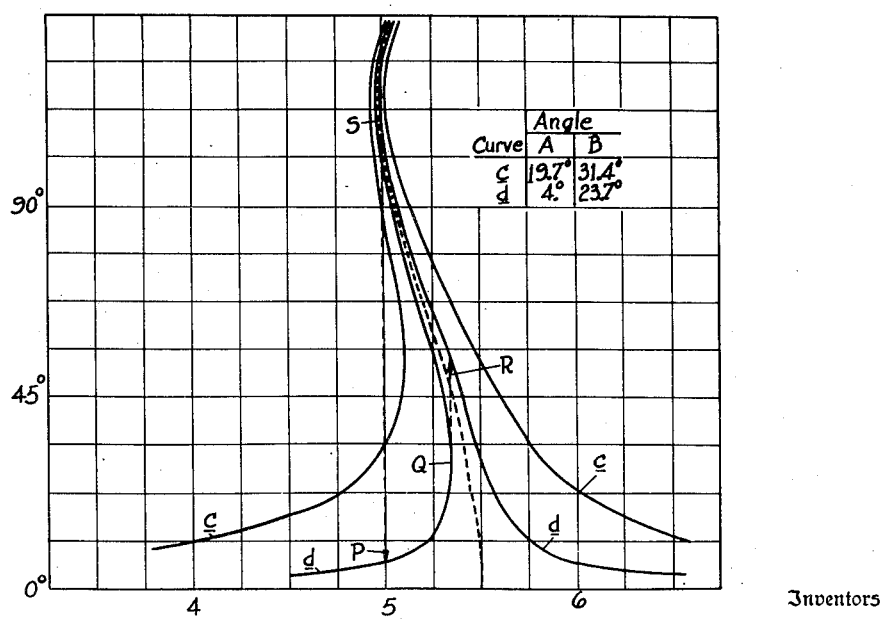

In Fig. 4 has been plotted the resonance curves obtained with the centrifugal restoring lugs B increased in size, all other conditions being the same as in Fig. 3. (See tables in Figs. 3 and 4 for the relative size of these lugs A and B for the four curves $a$, $b$, $c$ and $d$). It is to be noted that for small amplitude of oscillation the resonance curves are similar to the curves of Fig. 3 with a shift of the resonance frequency from 5 cycles per second to 5.5 cycles per second. This shift is caused by the increased restoring force introduced by the centrifugal restoring lugs 25. For large amplitude of oscillation, however, the non-linear character of the centrifugal restoring force causes a tilting of the resonance curves toward the low frequency side (see Fig. 4).

Referring to curve C, Fig. 4, it is evident that by making a correct choice of angle B (Fig. 2A) the low frequency branch of the resonance curve could have been made to have essentially infinite slope in the range of amplitudes lying between 45° and 100°. Thus for amplitudes lying in this range the frequency is essentially independent of amplitude. Since the rate of energy dissipation by an oscillating system is proportional to the square of the amplitude of oscillation, it is evident that the governor would operate correctly for variations in driving force of four to one.

The intermittent or hunting type of operation can now be described by reference to curve $d$, Fig. 4. It is to be noted that the resonance curve $d$ is triple valued in the range of frequencies 5.0 to 5.3 cycles per second. However, the middle value, namely the negative slope portion of the low frequency branch of curve $d$ represents an unstable state of oscillation. For this reason when the point Q is reached a jump takes place to the point R of the upper branch of the curve, as shown by dotted line Q—R.

The intermittent type of operation can be described as follows: It is assumed that the operation starts with the shaft rotating at a speed below 5.3 cycles per second. The amplitude of oscillation is assumed small, but the slowly increasing speed due to the driving force acting on shaft 168 causes an increase in amplitude until the point Q is reached. At this point there is a sudden increase in amplitude with a jump to the point R of the upper branch of the curve $d$. The increase in energy dissipation occasioned by the increased amplitude causes the speed of shaft 168 to decrease with a resulting increase in amplitude. The increased dissipation caused by increased amplitude causes increased loss in frequency of the shaft 168. This continues until the point S is reached. At this point the upper branch of curve $d$ also becomes unstable and there is a discontinuous jump, namely a fall in amplitude to the point P (see dotted line S—P) of the lower branch of curve $d$. The operation then repeats itself. The curve $d$, Fig. 4, is only intended to illustrate this process. An actual governor of this type would be designed in such a way as to make the jump Q—R large and the frequency difference P—Q small. The average speed of the governor is some type of average of the maximum and minimum speeds attained during a hunting cycle.

The operation of the intermittent governor, the operation curves of which are shown in Fig. 4, when used in the device of Fig. 1 has certain novel features. During power failure it operates in the manner described above in connection with Fig. 4 to manifest the passing of time. After the resumption of alternating current power the motor SM⁴, Fig. 1, acting as a generator, absorbs energy to keep the resonator operating in the range P–Q (curve $d$, Fig. 4). In the event that power is resumed while the resonator is in the range R–S it is assumed that the power dissipated by the resonator is so great that the motor SM⁴ is unable to deliver the requisite power to dominate it, to thereby result in a cycling of the resonator in the range P–Q. That is, it is assumed that the power dissipated by the mechanical resonator in the range R–S (curve $d$, Fig. 4) is so great that the synchronous motor SM⁴ is unable to lock in instantly. It is assumed that the variation in frequency of the regulated A. C. is not great enough to ever cause the point Q to be reached while the device, Fig. 1, is operating as an A. C. controlled clock. The novel feature of the hunting type construction lies in the fact that the amplitude of oscillation of the resonator is small while the clock, Fig. 1, is A. C. controlled. This results in reduced wear in the bearings 23 (Fig. 2B) and also the bearings of shaft 168. In other words, the governor of Figs. 2A and 2B will not effectively govern until an alternating current power cessation takes place so that the synchronous motor SM⁴ (Fig. 1) can easily dominate the mechanical governor.

Figure 5A:
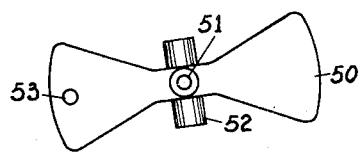
Figs. 5A and 5B illustrate how the balance wheel of Figs. 2A and 2B may be modified to constitute a vane type balance wheel.
Figure 5B:
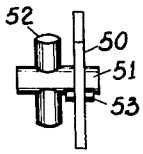

*Fig. 5 structure.*—Figs. 5A and 5B show side and end views respectively of a modified form of the balance wheel 20 of Fig. 2 and designed to be substituted for the balance wheel 20 in the device illustrated in Fig. 2. Referring to Figs. 5A and 5B the vane 50 together with the sleeve 51 and massive bar 52 form an inertial or harmonic system analogous to the wheel 20 and its associated lugs 24 and 25 of Figs. 2A and 2B. The sleeve 51 is designed to be pressed on the shaft 21, coaxially with itself, to replace the wheel 20 in Figs. 2A and 2B. The pin 53 is analogous to the lug 24 and performs the same function. The lugs 25 have their counterpart in an additional massiveness in the inertia bar 52.

The sleeve 51 is fixed to the shaft 21 in such a position that the center of gravity of the vane system, separate from the pin 53, Fig. 5, falls in the axis of shaft 168. The hair spring, as in the device illustrated in Figs. 2A and 2B should tend to bring the pin 53 in a position analogous to the lug 24, that is in line with the axis of shaft 168 when the shaft 168 assumes a position to place the vane 50 in a horizontal position.

*Fig. 5 operation.*—The operation of the vane type governor Fig. 5A and Fig. 5B is completely analogous to the operation of the balance wheel governor of Figs. 2A and 2B. The only difference in operation lies in the method by which energy is dissipated. In Fig. 2 energy is dissipated by air and frictional forces damping the vibration of the mechanical resonator 20, 21, 26. In the vane type modification of Fig. 2, shown in Fig. 5 in addition to this method of energy dissipation, energy is also dissipated by a fanning action caused by the vane 50 being brought periodically into a position approximately perpendicular to the shaft 168. In other words, the extent of fanning of air and other frictional losses of the Figs. 2A-2B structure is mostly dependent on the speed of oscillation of wheel 20; whereas, in the Figs. 5A-5B structure the extent of fanning is most pronounced when the vane 50 assumes a position substantially crosswise of the shaft 168 (Fig. 1). If desired an electro-magnet 150 acting on the spring 170 and weight 171, both constructed of magnetic material, may be added as shown in Fig. 1 to neutralize the effect of gravity or at least detune the reed 170 so long as the clock is dominated by alternating current, in that no mechanical governing action is desired under this condition.

The applicants have thus shown and described several forms of their invention for the purpose of example only and it should be understood that the present invention is not limited to the specific constructions illustrated and that proportions of parts may be varied and other changes and modifications made to adapt the invention to the particular problems encountered in practicing the same, except as demanded by the scope of the following claims.

What we claim as new is:

1. A clock of the rotary governed type comprising, a time shaft, a source of local energy tending to rotate said shaft, and means for controlling the speed of rotation of said shaft including an oscillatory means supported by said shaft for vibration with respect to said shaft so that the moment of inertia of said shaft and oscillatory means varies depending on the location of said oscillatory means with respect to the normal non-vibrated position of said oscillatory means, said oscillatory means vibrating in synchronism with the rotation of said shaft to cause substantial retardation of rotation of said shaft when the shaft reaches a rotary speed corresponding to the natural frequency of said oscillatory means.

2. In a sustained power clock, the combination with a shaft driven from a local source of energy, a synchronous alternating current motor for allowing said shaft to rotate at a speed proportional to the frequency of the current supplied to said motor, a harmonic element supported by and to oscillate with respect to said shaft and having a period of oscillation equal to the time of one revolution of said shaft when said shaft is operating at said speed, said element having sufficient friction and mass so that when operating at its maximum amplitude it will absorb the excess energy of said local source of energy, whereby a cessation of said alternating current will cause said shaft to continue to rotate at substantially the same speed as it formerly did as determined by said harmonic element.

3. In a sustained power clock, the combination with a shaft driven from a local source of energy, a synchronous alternating current motor for allowing said shaft to rotate at a speed proportional to the frequency of the current supplied to said motor, a harmonic element supported by and to oscillate about an axis substantially at a right angle to the axis of said shaft and having a period of oscillation equal to the time of one revolution of said shaft when said shaft is operating at said speed, said element having sufficient friction and mass so that when operating near its maximum amplitude it will absorb the excess energy of said local source of energy, whereby a cessation of said alternating current will cause said shaft to continue to rotate at substantially the same speed as it did prior to such current cessation as determined by said harmonic element.

4. In a sustained power clock, the combination with a shaft driven from a local source of energy, a synchronous alternating current motor for allowing said shaft to rotate at a speed proportional to the frequency of the current supplied to said motor, a harmonic element supported by and to oscillate about an axis at an angle to the axis of said shaft and having a frequency of oscillation substantially equal to the speed of said shaft when said shaft is operating at said speed, said element having sufficient friction and mass so that when operating near its maximum amplitude it will absorb the excess energy of said local source of energy, whereby a cessation of said alternating current will cause said shaft to continue to rotate at substantially the same speed as it did prior to said current cessation as determined by said harmonic element.

5. In combination, a shaft, a source of alternating current, a synchronous motor energized from said source for driving said shaft, a local source of energy tending to rotate said shaft, and a reed supported co-axially with said shaft and having a natural period of vibration equal to the time of one revolution of said shaft when driven by said synchronous motor at its average speed, said reed being so supported by said shaft that gravity may act thereon in opposite directions intermittently as said shaft is rotated to thereby cause it to be bent alternately in opposite directions to cause vibration of said reed to produce governing action upon said shaft to cause it to be operated by said local source of energy at a speed substantially equal to the natural frequency of said reed, whereby a cessation of said alternating current will cause said reed to allow operation of said shaft at substantially the same speed as it did when controlled by said synchronous motor.

6. In combination, a shaft, a synchronous motor for driving said shaft, a local source of energy tending to rotate said shaft at a higher speed, and a reed supported co-axially with said shaft and having a natural frequency of vibration substantially equal to the speed of said shaft when driven by said synchronous motor at its average speed, said reed being so supported by said shaft as to be intermittently bent by the action of gravity and in directions to cause vibration of said reed to produce governing action upon said shaft to cause it to be operated by said local source of energy at a speed substantially equal to the natural frequency of said reed, whereby a cessation of alternating current for controlling operation of said shaft will cause said reed to allow operation of said shaft at substantially said average speed.

7. In combination, a synchronous motor driven time shaft, a balance supported by said shaft and having its center of gravity substantially in the axis of said shaft and rotatable about an axis substantially at a right angle to the axis of said shaft, a spring for timing said balance to have a natural frequency of oscillation equal to the average speed of said shaft when driven by said synchronous motor, a local source of energy tending to rotate said shaft at a higher speed, and means for causing said balance to oscillate at the speed of said shaft and at an amplitude dependent on the closeness of said speed to the natural frequency of said balance.

8. In combination, a synchronous motor driven time shaft, a balance supported by said shaft having its center of gravity substantially in the axis of said shaft and rotatable about an axis substantially at a right angle to the axis of said shaft, a spring for timing said balance to have a natural frequency of oscillation equal to the average speed of said shaft when driven by said synchronous motor, a local source of energy tending to rotate said shaft at a higher speed, said balance having its mass distributed to have created a centrifugal restoring force therein tending to restore it to the position to which it is biased by said spring, and means for causing said balance to oscillate at the speed of said shaft and at an amplitude dependent on the closeness of said speed to the natural frequency of said balance, whereby upon deenergization of said motor the restoring force of said balance causes intermittent variation in the speed of said shaft and hunting operation thereof.

9. In combination, a synchronous motor driven time shaft, a balance supported by said shaft having its center of gravity substantially in the axis of said shaft and rotatable about an axis substantially at a right angle to the axis of said shaft, a spring for timing said balance so as to have a natural frequency of oscillation equal to the average speed of said shaft when driven by said synchronous motor, a local source of energy tending to rotate said shaft at a higher speed, said balance being constructed to have a centrifugal restoring force superimposed upon the restoring force of said spring, and means including said balance to cause said balance to oscillate at the speed of operation of said shaft and to oscillate at maximum amplitude when said shaft reaches a speed near the natural frequency of said balance.

10. In combination, a synchronous motor driven time shaft, a balance supported by said shaft having when it assumes a predetermined position its center of gravity substantially in the axis of said shaft and rotatable about an axis at an angle to the axis of said shaft, a spring for biasing said balance toward said predetermined position and timing said balance so as to have a natural frequency of oscillation slightly above the average speed of said shaft when driven by said synchronous motor so that the amplitude of vibration of said balance will not reach its maximum value during the average speed of said motor, a local source of energy tending to rotate said shaft at a higher speed, said balance being constructed to have a centrifugal restoring force superimposed upon the restoring force of said spring to render its natural frequency very critical, said balance due to the action of gravity oscillating at the speed of operation of said shaft and oscillating at maximum amplitude when said shaft reaches a speed equal to the natural frequency of said balance, and a vane associated with said balance in a manner to lie substantially in the axis of said shaft when said balance assumes the position to which it is biased by said spring to thereby cause maximum fanning of the surrounding air to occur when said balance oscillates at its maximum amplitude due to a current cessation to thereby cause the speed of said shaft to fall below said average speed.

11. In combination, a time shaft, a balance supported by said shaft having when it assumes a predetermined position its center of gravity substantially in the axis of said shaft and rotatable about an axis at an angle to the axis of said shaft, a spring for biasing said balance toward said predetermined position and timing said balance so as to have a natural frequency of oscillation slightly above the average speed of said shaft when correctly manifesting the passing of time, a local source of energy tending to rotate said shaft at a higher speed, said balance due to the action of gravity oscillating at the speed of operation of said shaft and oscillating at maximum amplitude when said shaft reaches a speed equal to the natural frequency of said balance, and a vane associated with said balance in a manner to lie substantially in the axis of said shaft when said balance assumes the position to which it is biased by said spring to thereby cause maximum fanning of the surrounding air to occur when said balance oscillates at its maximum amplitude to thereby cause the speed of said shaft to temporarily fall below said average speed.

12. In combination, a synchronous motor driven time shaft, a balance supported by said shaft having its center of gravity substantially in the axis of said shaft and rotatable about an axis at an angle to the axis of said shaft, a spring for timing said balance to have a natural frequency of oscillation slightly above the average speed of said shaft when driven by said synchronous motor, a local source of energy tending to rotate said shaft at a higher speed, said balance having its mass distributed to have created a centrifugal restoring force therein tending to restore it to the position to which it is biased by said hair spring, and means acted on by gravity for causing said balance to oscillate at the speed of said shaft and at an amplitude dependent on the closeness of said speed to the natural frequency of said balance, whereby the restoring force of said balance causes intermittent variation in the speed of said shaft above and below said average speed and hunting operation thereof.

13. In combination, a synchronous motor driven time shaft, a balance supported by said shaft having its center of gravity substantially in the axis of said shaft and rotatable about an axis at an angle to the axis of said shaft, a spring for timing said balance so as to have a natural frequency of oscillation slightly above the average speed of said shaft when driven by said synchronous motor, a local source of energy tending to rotate said shaft at a higher speed, and means acted on by gravity for causing said balance to oscillate at the speed of said shaft and at an amplitude dependent on the closeness of said speed to the natural frequency of said balance, whereby the restoring force of said balance causes intermittent variation in the speed of said shaft and hunting operation thereof above and below said average speed.

14. In combination, a synchronous motor driven time shaft, a balance supported by said shaft having its center of gravity under average conditions substantially in the axis of said shaft and rotatable about an axis at an angle to the axis of said shaft, a spring for timing said balance to have a natural frequency of oscillation equal to the average speed of said shaft when driven by said synchronous motor, a local source of energy tending to rotate said shaft at a higher speed, and means including said balance to cause said balance to oscillate at the speed of operation of said shaft and to oscillate at maximum amplitude when said shaft reaches a speed equal to the natural frequency of said balance.

15. In combination, a synchronous motor driven time shaft, a balance supported by said shaft having when it assumes a predetermined position its center of gravity substantially in the axis of said shaft and rotatable about an axis at an angle to the axis of said shaft, a spring for biasing said balance toward said predetermined position and timing said balance so as to have a natural frequency of oscillation equal to the average speed of said shaft when driven by said synchronous motor, a local source of energy tending to rotate said shaft at a higher speed, means acted upon by gravity to cause said balance to oscillate at the speed of operation of said shaft and to oscillate at maximum amplitude when said shaft reaches a speed equal to the natural frequency of said balance, and a vane supported by said balance so as to lie substantially in the axis of said shaft when said balance assumes the position to which it is biased by said spring as a result of which its fanning action is a maximum when the amplitude of oscillation of said balance is a maximum.

16. In combination, a synchronous motor driven time shaft, a balance supported by said shaft having its center of gravity substantially in the axis of said shaft and rotatable about an axis at an angle to the axis of said shaft, a spring for timing said balance so as to have a natural frequency of osciltion equal to the average speed of said shaft when driven by said synchronous motor, a local source of energy tending to rotate said shaft at a higher speed, and means acted on by gravity for causing said balance to oscillate at the speed of said shaft and at an amplitude dependent on the closeness of said speed to the natural frequency of said balance.

17. In combination, a synchronous motor driven time shaft, a balance supported by said shaft having when it assumes a predetermined position its center of gravity substantially in the axis of said shaft and rotatable about an axis at an angle to the axis of said shaft, a spring for biasing said balance toward said predetermined position and timing said balance so as to have a natural frequency of oscillation equal to the average speed of said shaft when driven by said synchronous motor, a local source of energy tending to rotate said shaft at a higher speed, means acted on by gravity for causing said balance to oscillate at the speed of said shaft and at an amplitude dependent on the closeness of said speed to the natural frequency of said balance, and a vane supported by said balance so as to lie substantially in the axis of said shaft when said balance assumes the position to which it is biased by said spring, whereby said vane will resist rotation of said shaft to a maximum extent when said balance is oscillated at its maximum amplitude.

18. In combination, a shaft, a source of alternating current, a synchronous motor energized from said source for driving said shaft, a local source of energy tending to rotate said shaft, and a reed supported within the axis of said shaft and having a natural frequency of vibration proportional to the speed of said shaft when driven by said synchronous motor at its average speed, a vane supported by said reed with the plane of said vane in the plane of vibration of said reed, said reed being so supported by said shaft as to be intermittently tensioned by gravity and in directions to cause vibration of said reed to produce governing action upon said shaft to cause it to be operated by said local source of energy at a speed substantially equal to the natural frequency of said reed, whereby a cessation of said alternating current for controlling operation of said shaft at synchronous speed will due to oscillation and fanning cause said reed to allow operation of said shaft at substantially synchronous speed, and time manifesting means driven by said shaft.

19. In combination, a shaft, a source of alternating current, a synchronous motor for driving said shaft energized from said source, a local source of energy tending to rotate said shaft at a higher speed, and a reed supported co-axially with said shaft and having a natural frequency of vibration proportional to the speed of said shaft when driven by said synchronous motor at its average speed, said reed being so supported by said shaft as to be intermittently bent by the action of gravity and in directions to cause vibration of said reed to produce governing action upon said shaft to cause it to be operated by said local source of energy at a speed substantially equal to the natural frequency of said reed, electro-responsive means energized by current from said alternating current source for opposing the action of gravity upon said reed, whereby a cessation of said alternating current will cause said reed to vibrate to allow operation of said shaft at substantially said average speed.

20. In a clock mechanism, the combination with a time shaft, a balance supported by said shaft and having its center of gravity substantially in the axis of said shaft and rotatable about its axis at an angle to the axis of said time shaft, a spring for timing said balance so as to have a natural frequency of oscillation substantially the same as the speed of said time shaft when operating to accurately manifest the passing of time, a local source of energy tending to rotate said shaft at a higher speed, means for causing said balance to oscillate at the speed of said shaft and at an amplitude dependent on the closeness of said speed to the natural frequency of said balance, and time manifesting means driven by said shaft.

21. In a clock mechanism, the combination with a time shaft, a balance supported by said shaft and having its center of gravity substantially in the axis of said shaft and rotatable about its axis at an angle to the axis of said time shaft, a spring for timing said balance so as to have a natural frequency of oscillation substantially the same as the speed of said time shaft when operating to accurately manifest the passing of time, a local source of energy tending to rotate said shaft at a higher speed, means for causing said balance to oscillate at the speed of said shaft and at an amplitude dependent on the closeness of said speed to the natural frequency of said balance, time manifesting means driven by said shaft, and a vane supported by said balance in a manner that it will absorb energy to a maximum extent when said balance is oscillated through a maximum angle of oscillation.

22. In a clock mechanism, the combination with a time shaft, a local source of energy tending to rotate said shaft, a reed supported co-axially with said shaft and having a natural frequency of vibration equal to the speed of said shaft when operating to accurately manifest the passing of time, said reed being so supported by said shaft as to be intermittently bent by the action of gravity and in directions to cause oscillation of said reed to produce governing action upon said shaft to cause it to be operated by energy from said local source at a speed substantially equal to the natural frequency of said reed, and time manifesting means driven by said shaft.

23. In combination, a shaft, a source of alternating current, a synchronous motor energized from said source for driving said shaft, a local source of energy tending to rotate said shaft at a higher speed, and oscillatory means supported in the axis of said shaft and having a natural frequency of vibration proportional to the speed of said shaft when driven by said synchronous motor at its average speed, said means including attractable means and being acted upon by an external attractive force and being so supported by said shaft as to be intermittently actuated in synchronism with the rotation of said shaft, said actuations occurring when said shaft assumes substantially the same rotated positions and in directions to cause oscillation of said means to produce governing action upon said shaft to cause it to be operated by said local source of energy at a speed proportional to the natural frequency of said means, whereby a cessation of said alternating current for controlling operation of said shaft will cause said means to allow operation of said shaft at substantially the same speed as it did prior to such current cessation, and time manifesting means driven by said shaft.

24. In a clock mechanism, the combination with a time shaft, a local source of energy tending to rotate said shaft, oscillatory means supported coaxially with said shaft and having a natural frequency of oscillation equal to the speed of said shaft when operating to accurately manifest the passing of time, said oscillatory means being so supported by said shaft as to be intermittently actuated by the action of gravity and in directions dependent on the position assumed by said shaft to cause oscillation of said oscillatory means to produce governing action upon said shaft to cause it to be operated by energy from said local source at a speed substantially equal to the natural frequency of said oscillatory means, and time manifesting means driven by said shaft.

25. In combination, a synchronous motor driven time shaft, a balance supported by said shaft having its center of gravity under average conditions substantially in the axis of said shaft and rotatable about an axis at an angle to the axis of said shaft, a spring for timing said balance to have a natural frequency of oscillation equal to the average speed of said shaft when driven by said synchronous motor, a local source of energy tending to rotate said shaft at a higher speed, means including said balance to cause said balance to oscillate at the speed of operation of said shaft and to oscillate at maximum amplitude when said shaft reaches a speed equal to the natural frequency of said balance, and means controlled by alternating from the source controlling said synchronous motor for rendering said oscillatory means inactive so long as said source does not fail.

26. In combination, a synchronous motor driven time shaft, a balance supported by said shaft having its center of gravity substantially in the axis of said shaft and oscillatable about an axis at an angle to the axis of said shaft, said balance having a natural frequency of oscillation equal to the average speed of said shaft when driven by said synchronous motor, a local source of energy tending to rotate said shaft at a high speed, means acted on by gravity for causing said balance to oscillate at the speed of said shaft and at an amplitude dependent on the closeness of said speed to the natural frequency of said balance, and means controlled from the source of alternating current controlling said synchronous motor for detuning said balance so long as alternating current is supplied by said source, whereby said balance becomes effective to govern the speed of rotation of said time shaft only when said source of alternating current fails.

OSCAR H. DICKE.
ROBERT H. DICKE.

REFERENCES CITED

The following references are of record in the file of this patent:

UNITED STATES PATENTS

| Number | Name | Date |
|---|---|---|
| 2,281,494 | Hammond | Apr. 28, 1942 |

FOREIGN PATENTS

| Number | Country | Date |
|---|---|---|
| 740,198 | France | Nov. 12, 1932 |
| 833,085 | France | July 11, 1938 |